US012627972B2

(12) United States Patent
Hong

(10) Patent No.: US 12,627,972 B2
(45) Date of Patent: May 12, 2026

(54) METHOD FOR INFORMATION TRANSMISSION, COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 587 days.

(21) Appl. No.: 17/916,389

(22) PCT Filed: Apr. 2, 2020

(86) PCT No.: PCT/CN2020/083053
§ 371 (c)(1),
(2) Date: Sep. 30, 2022

(87) PCT Pub. No.: WO2021/196139
PCT Pub. Date: Oct. 7, 2021

(65) Prior Publication Data
US 2023/0156458 A1    May 18, 2023

(51) Int. Cl.
*H04W 8/20* (2009.01)
*H04W 8/24* (2009.01)
*H04W 76/10* (2018.01)

(52) U.S. Cl.
CPC ............. *H04W 8/205* (2013.01); *H04W 8/24* (2013.01); *H04W 76/10* (2018.02)

(58) Field of Classification Search
CPC ....... H04W 76/15; H04W 76/10; H04W 8/24; H04W 8/205; H04W 88/06
See application file for complete search history.

(56) References Cited

U.S. PATENT DOCUMENTS

| | | | |
|---|---|---|---|
| 2016/0219648 A1 | 7/2016 | Awoniyi-Oteri et al. | |
| 2017/0150502 A1* | 5/2017 | Chirala | H04W 36/0069 |
| 2018/0084601 A1* | 3/2018 | Dhanapal | H04W 76/30 |
| 2018/0146365 A1* | 5/2018 | Dhanapal | H04W 8/183 |
| 2019/0053130 A1* | 2/2019 | Guo | H04L 1/0026 |
| 2021/0204111 A1* | 7/2021 | Jung | H04W 76/15 |
| 2021/0282103 A1* | 9/2021 | Zhu | H04W 76/15 |

(Continued)

FOREIGN PATENT DOCUMENTS

| | | |
|---|---|---|
| CN | 107529155 A | 12/2017 |
| CN | 110463238 A | 11/2019 |
| WO | WO 2018141081 A1 | 8/2018 |

OTHER PUBLICATIONS

PCT/CN2020/083053 International Search Report dated Dec. 29, 2020; 2 pages.

(Continued)

*Primary Examiner* — Congvan Tran
(74) *Attorney, Agent, or Firm* — Cozen O'Connor

(57) ABSTRACT

A method for information transmission is provided, which is applicable to a terminal and includes sending indication information that the terminal has multiple SIMS to a base station in a process of establishing a radio resource control (RRC) connection. Using the RRC signaling to carry request content indication information can improve the utilization efficiency of the RRC signaling, reduce the interaction complexity caused by the newly added signaling and reduce the development workload.

14 Claims, 6 Drawing Sheets

(56) References Cited

U.S. PATENT DOCUMENTS

| | | | |
|---|---|---|---|
| 2022/0256328 A1* | 8/2022 | Xie ..................... | H04W 72/044 |
| 2023/0007732 A1* | 1/2023 | Zhang .................. | H04W 68/12 |
| 2023/0047213 A1* | 2/2023 | Chen .................. | H04W 60/005 |
| 2023/0254918 A1* | 8/2023 | Gurumoorthy ......... | H04W 8/24 |
| | | | 455/435.1 |
| 2023/0379998 A1* | 11/2023 | Jung .................... | H04W 76/20 |

OTHER PUBLICATIONS

European Patent Application No. 20928980.0, extended Search and Opinion dated Apr. 21, 2023, 10 pages.
Chinese Patent Application No. 202080000624.7, Office Action dated Sep. 5, 2022, 6 pages.
Chinese Patent Application No. 202080000624.7, English translation of Office Action dated Sep. 5, 2022, 9 pages.
ZTE "Discussion on the way forward to the key issue#2" SA WG2 Meeting #S2-136AH, S2-2000935, Jan. 2020, 2 pages.

* cited by examiner

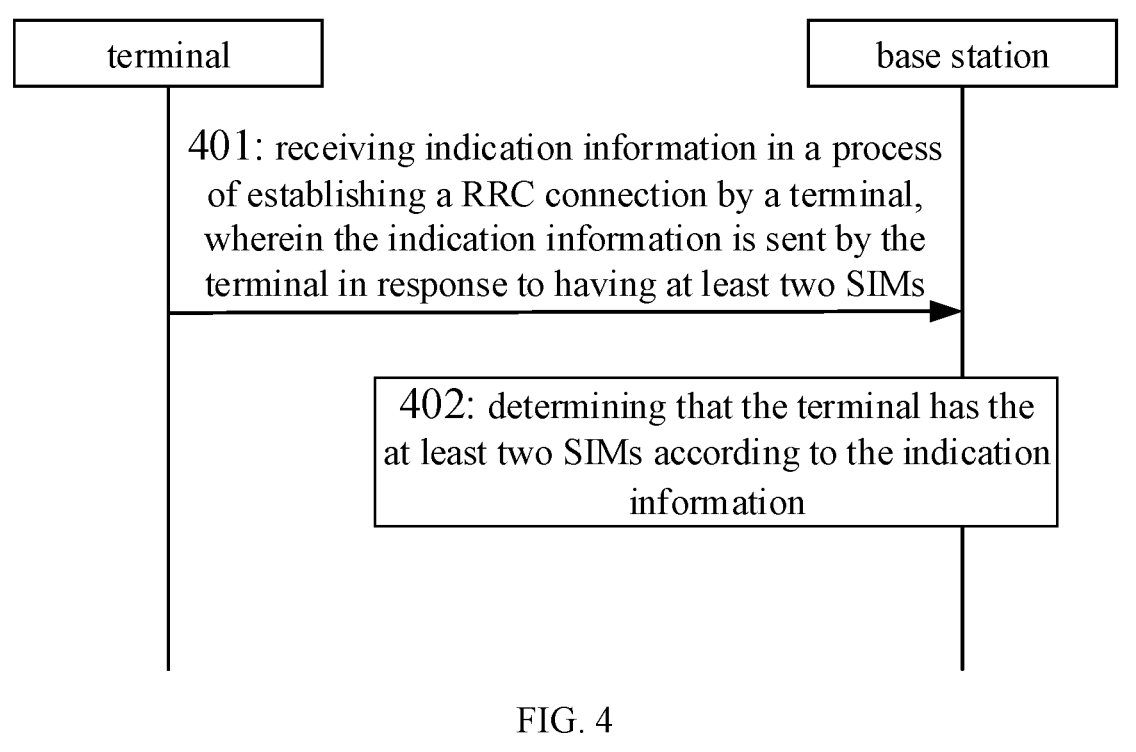

```
┌──────────────┐                                    ┌──────────────┐
│   terminal   │                                    │ base station │
└──────┬───────┘                                    └──────┬───────┘
       │                                                   │
       │  401: receiving indication information in a process
       │     of establishing a RRC connection by a terminal,
       │     wherein the indication information is sent by the
       │     terminal in response to having at least two SIMs
       │ ─────────────────────────────────────────────────▶│
       │                                                   │
       │            ┌──────────────────────────────────────┴──┐
       │            │  402: determining that the terminal has the │
       │            │  at least two SIMs according to the indication │
       │            │                 information               │
       │            └──────────────────────────────────────┬──┘
       │                                                   │
       │                                                   │
```

FIG. 4

METHOD FOR INFORMATION TRANSMISSION, COMMUNICATION DEVICE, AND STORAGE MEDIUM

CROSS-REFERENCE TO RELATED APPLICATION

This application is the national phase of International Application No. PCT/CN2020/083053, filed on Apr. 2, 2020, the content of which is hereby incorporated by reference in its entirety.

TECHNICAL FIELD

The disclosure relates to the field of wireless communication technologies, and more particularly, to a method for information transmission, a communication device and a storage medium.

BACKGROUND

There are an increasing number of multi-SIM (multiple subscriber identification modules) terminals such as multi-SIM mobile phones on the market as wireless communication technologies continue to develop. Typical scenarios of multi-SIM mobile phones include the following. A business user can have a private SIM and a business SIM and the two SIMs are placed on the same phone. An ordinary user can have multiple private SIMs and can choose a SIM from the multiple SIMs to use according to a communication service.

For a multi-SIM terminal, a network currently considers different SIMs as different terminals, and each SIM communicates with the network independently. There is no interconnection communication relationship among multiple SIMs.

SUMMARY

According to a first aspect of embodiments of the disclosure, a method for information transmission is provided, which is applicable to a terminal and includes sending indication information that the terminal has multiple SIMs to a base station in a process of establishing a radio resource control (RRC) connection.

According to a second aspect of embodiments of the disclosure, a method for information transmission is provided, which is applicable to a base station and includes: receiving indication information in a process of establishing a RRC connection by a terminal, in which the indication information is sent by the terminal in response to having at least two SIMs; and determining that the terminal has the at least two SIMs according to the indication information.

According to a third aspect of embodiments of the disclosure, a communication device is provided, which includes a processor, a transceiver, a memory, and an executable program stored on the memory and capable of being executed by the processor. The processor is configured to execute the executable program to perform the method as described in the first aspect or the second aspect.

According to a fourth aspect of embodiments of the disclosure, a storage medium is provided, which has stored therein an executable program that executed by a processor, causes the processor to perform the method as described in the first aspect or the second aspect.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 4 is a flowchart of yet another method for information transmission according to some embodiments.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The terms used in embodiments of the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the word "if" as used herein can be interpreted as "when", "while" or "in response to determining".

Figure 1:
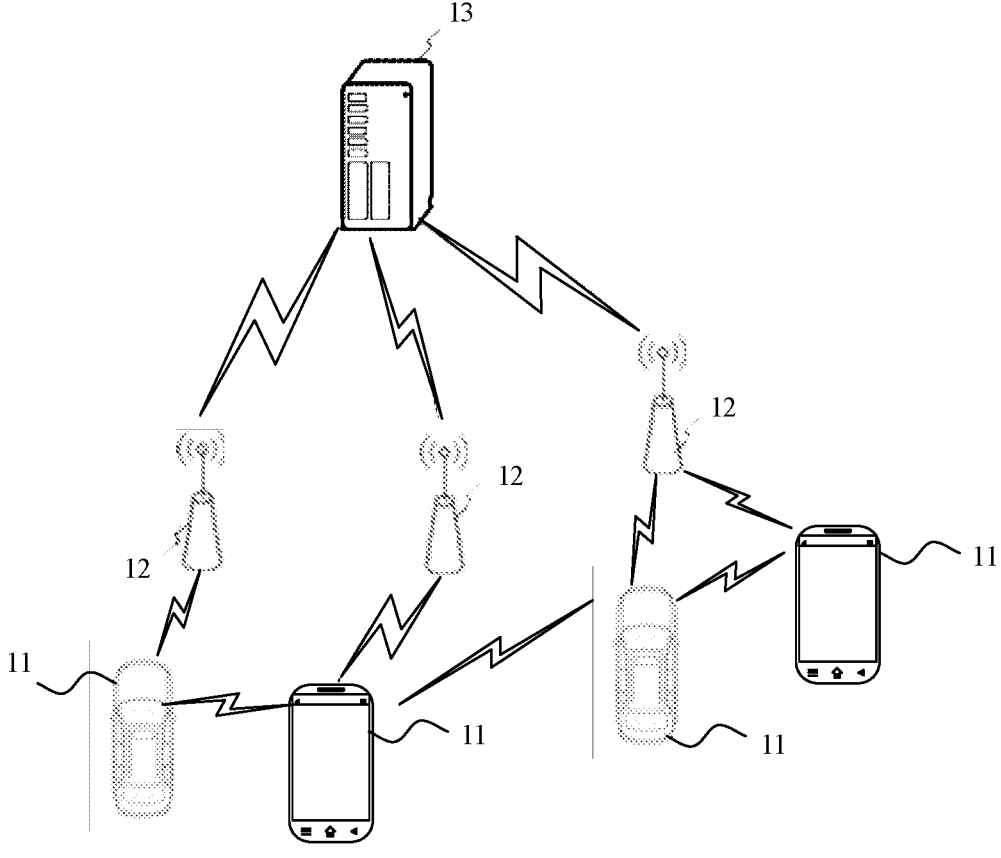
FIG. 1 is a schematic structural diagram of a wireless communication system according to some embodiments.

Referring to FIG. 1, FIG. 1 illustrates a schematic diagram of a wireless communication system according to some embodiments of the disclosure. As illustrated in FIG. 1, the wireless communication system is a communication system based on cellular mobile communication technologies. The wireless communication system includes terminals 11 and base stations 12.

The terminal 11 may be a device that provides voice and/or data connectivity to a user. The terminal 11 may communicate with one or more core networks via a radio access network (RAN). The terminal 11 may be an Internet of Things (IoT) UE such as a sensor device, a mobile phone (or "cellular" phone) and a computer with the IoT UE. The terminal 11 may be a fixed, portable, pocket, hand-held, computer built-in or a vehicle-mounted device, for example, a station (STA), a subscriber unit, a subscriber station, a mobile station, a mobile, a remote station, an access point, a remote terminal, an access terminal, a user terminal, a user agent, a user device, or a UE. Alternatively, the UE 11 terminal 11 may also be a device of an unmanned aerial vehicle. Alternatively, the terminal 11 may also be a vehicle-mounted device, for example, an engine control unit (ECU) with a wireless communication function or a wireless communication device externally connected to the ECU. Alternatively, the terminal 11 may also be a roadside device, for example, a streetlight, a signal light, or other roadside devices with a wireless communication function.

The base station 12 may be a network-side device in the wireless communication system. The wireless communication system may be a 4$^{th}$ generation (4G) mobile communication system, also known as a long term evolution (LTE) system. Or, the wireless communication system may also be a 5$^{th}$ generation (5G) mobile communication system, also known as a new radio (NR) system or 5G NR system. Alternatively, the wireless communication system may also be a next-generation system of the 5G system. The access network in the 5G system may be called new generation-radio access network (NG-RAN), or machine-type communication (MTC) system.

The base station 12 may be an evolved base station (eNB) employed in the 4G system. Alternatively, the base station 12 may also be a base station (gNB) that adopts a centralized distributed architecture in the 5G system. When the base station 12 adopts the centralized distributed architecture, it usually includes a central unit (CU) and at least two distributed units (DUs). The central unit is provided with protocol stacks of a packet data convergence protocol (PDCP) layer, a radio link control (RLC) layer, and a media access control (MAC) layer. A protocol stack of a physical (PHY) layer is set in the DU. The specific implementation manner of the base station 12 is not limited in embodiments of the disclosure.

A wireless connection can be established between the base station 12 and the terminal 11 through a radio air interface. In different embodiments, the radio air interface may be a radio air interface based on the 4G mobile communication network technology standard, or the radio air interface may be a radio air interface based on the 5G mobile communication network technology standard, for example, the radio air interface is a NR, or, the radio air interface may also be a radio air interface based on a next generation of 5G mobile communication network technology standard In some embodiments, an end to end (E2E) connection may also be established between the terminals 11, for example, scenes of vehicle to vehicle (V2V) communication, vehicle to infrastructure (V2I) communication and vehicle to pedestrian (V2P) communication in vehicle to everything (V2X) communication.

In some embodiments, the above wireless communication system may further include a network management device 13.

Base stations 12 are connected to the network management device 13 respectively. The network management device 13 may be a core network device in the wireless communication system, for example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS). The implementation form of the network management device 13 is not limited in some embodiments of the disclosure.

Execution subjects involved in embodiments of the disclosure include, but are not limited to terminals that support multi-SIM and base stations.

Scenarios of embodiments of the disclosure may be that, currently, manners of processing multi-SIM mobile phones are based on implementation of various terminal manufacturers and there is no unified regulation standard, which leads to different terminal behaviors and processing manners, for example, dual-SIM single-standby, dual-SIM dual-standby single-pass, and dual-SIM dual-standby dual-pass. Also, it may cause the following problems.

1, when a multi-SIM terminal communicates with a first communication network through a first SIM, it needs to detect from time to time a second communication network established through a second SIM, such as monitoring paging, performing measurements, or reading system messages, which may affect the communication performance of the first communication network.

2, the paging time is calculated based on the identity of the terminal, and the multi-SIM terminal has multiple SIMs, which may cause systematic paging collisions.

3, when the multi-SIM terminal receives a paging message on the second communication network, it needs to determine whether it needs to respond to the paging, and this is based on rules configured by the user. When the multi-SIM terminal decides to respond to the paging message of the second communication network, it needs to stop the first communication network currently being performed. If there is no suspension mechanism for the current activity, the terminal will automatically disconnect the RRC connection with the first communication network and leave. In addition, after the terminal leaves, the first communication network will continue to page the terminal, resulting in a waste of paging resources.

The reason for the above problems is that the communication network side may not determine that the terminal has multiple SIMs, and thus may not coordinate communication of multiple SIMs.

Figure 2:
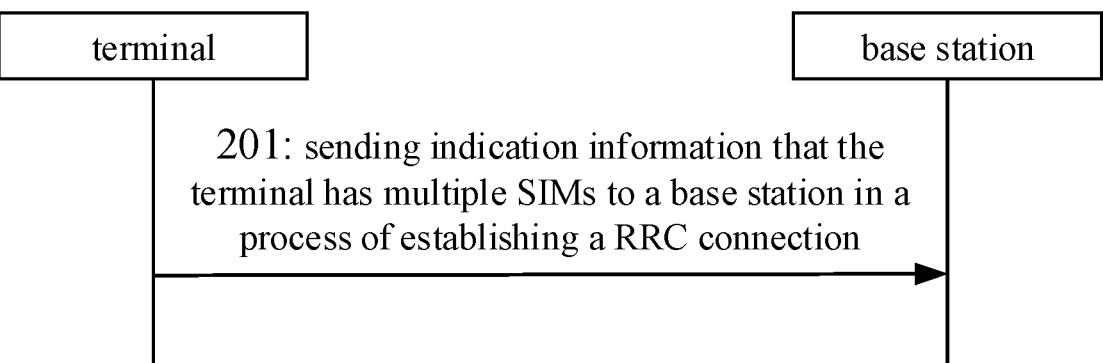
FIG. 2 is a flowchart of a method for information transmission according to some embodiments.

As illustrated in FIG. 2, a method for information transmission is provided in some embodiments. The method for information transmission can be applicable to a wireless communication device such as a terminal. The method includes the following.

In step 201, indication information that the terminal has multiple SIMs is sent to a base station in a process of establishing a RRC connection.

Herein the terminal may be a multi-SIM terminal. The behavior mode of the terminal may be dual-SIM dual-standby single-pass, dual-SIM dual-standby dual-pass or the like.

The SIM may be an SIM that exists in a separate individual form or an embedded SIM (e-SIM) that exists inside the terminal in an integrated form.

When the terminal has multiple SIMs, the terminal may send the indication information that the terminal has the multiple SIMs to the base station, to indicate the base station that it has the multiple SIMs. Herein the multiple SIMs may be two or more SIMs. The terminal may carry the indication information of the multiple SIMs in an uplink RRC signaling during establishing the RRC connection. The terminal may use any one of its own communication networks connected by the multiple SIMs to send the indication information of the multiple SIMs.

In the process of establishing the RRC connection with the base station, such as switching from the idle state to the connected state or from the inactive state to the connected state, the terminal sends the indication information that it has the multiple SIMs through the RRC signaling to the base station that establishes the RRC connection.

For example, an information unit may be set in the uplink RRC signaling during the RRC connection process for setting the indication information. For example, "1" can be used in the reserved bit of the uplink RRC signaling to indicate that the terminal has multiple SIMs and "0" can be used to indicate that the terminal has one SIM, or "0" can be used to indicate that the terminal has multiple SIMs and "1" can be used to indicate that the terminal has one SIM. Using the RRC signaling to carry request content indication information can improve the utilization efficiency of the RRC signaling, reduce the interaction complexity caused by the newly added signaling and reduce the development workload.

The indication information of the multiple SIMs may also be used to indicate the number of SIMs that the terminal has. For example, two bits can be used to indicate the number of SIMs, "00" is used to indicate that the terminal has one SIM, "01" is used to indicate that the terminal has two SIMs, "10" is used to indicate that the terminal has three SIMs and "11" is used to indicate that the terminal has four SIMs.

After receiving the indication information of the multiple SIMs, the base station can determine that the terminal has the multiple SIMs. If the base station has different configurations or different communication manners for the single-SIM terminal and the multi-SIM terminal, it can perform different configurations or adopt different communication manners based on the indication information of the multiple SIMs.

In this way, when establishing the RRC connection, the terminal can explicitly inform the base station of the event that it has the multiple SIMs, through the indication information of the multiple SIMs, which improves the transparency of states of the multiple SIMs of the terminal and increases the convenience of obtaining by the base station the multiple SIMs of the terminal. The base station can obtain the above-mentioned indication information report when establishing the RRC connection with the terminal. In this way, the base station learns whether the terminal supports the multiple SIMs earlier so as to facilitate the follow-up coordination scheduling to the multiple SIMs in the multiple SIMs of the terminal.

Figure 3:
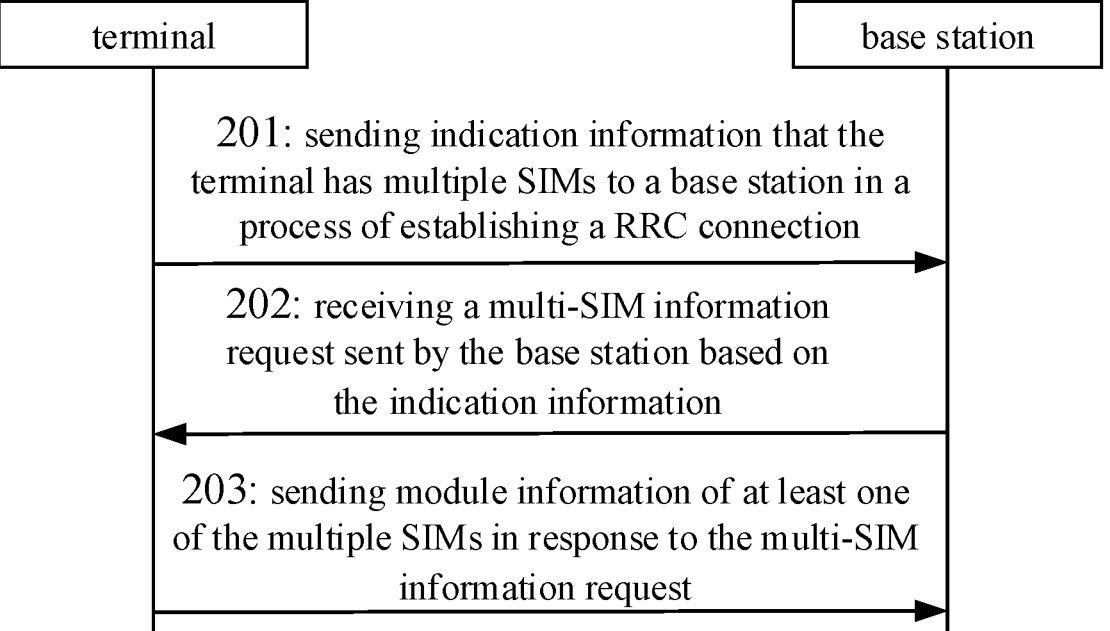
FIG. 3 is a flowchart of another method for information transmission according to some embodiments.

In some embodiments, as illustrated in FIG. 3, the method for information transmission may further include the following.

In step 202, a multi-SIM information request sent by the base station based on the indication information is received.

In step 203, module information of at least one of the multiple SIMs is sent in response to the multi-SIM information request.

After determining that the terminal has the multiple SIMs, the base station can request to obtain module information of one or more SIMs by sending the multi-SIM information request. Herein the module information may include: identity information of the SIM and/or operator information accessible by the SIM and the like. The module information may also include state information of the SIM, for example, the SIM is in an on or off state.

After receiving the multi-SIM information request, the terminal can send the module information of one or more SIMs to the base station.

After obtaining the module information, the base station can determine the communication network, the operator and the working state of each SIM and then can coordinate communication of each SIM. The base station can configure communication resources for each SIM through downlink commands and the like. The allocated communication resources of each SIM may not overlap. In this way, conflicts in configuration of communication resources of each SIM can be reduced.

For example, when the first SIM is paged, the communication of the second SIM may be suspended. It reduces the invalid paging for the second SIM caused by the terminal responding to the paging of the first SIM and the second SIM being disconnected from the communication network.

In some embodiments, step 202 may include: receiving a UEInformationRequest signaling carrying the multi-SIM information request from the base station.

Step 203 may include: sending a UEInformationResponse signaling carrying the module information.

The base station may carry the multi-SIM information request in the UEInformationRequest signaling, to request the terminal to obtain module information of multiple SIMs. The multi-SIM information request may be carried in the UEInformationRequest signaling in the form of a MUSIM-InfoReq information unit.

The terminal can send the module information to the base station through the UEInformationResponse signaling. The module information can be carried in the UEInformation-Response signaling in the form of a MUSIMInfoReport information unit.

Carrying the multi-SIM information request and/or module information in the RRC signaling can improve the utilization efficiency of the RRC signaling, reduce the interaction complexity caused by the newly added signaling and reduce the development workload.

In some embodiments, the method for information transmission may further include: receiving request content indication information, in which the request content indication information is configured to indicate module information of a SIM requested by the base station.

Step 203 may include: sending module information of at least one SIM indicated by the request content indication information.

Herein the request content indication information. The module information may include: identity information of the SIM, and/or operator information accessible by the SIM, and/or state information of the SIM. The base station may receive the module information requested by the request content indication information based on communication requirements of the SIM.

For example, it may indicate that only the identity information of the SIM is required. The multi-SIM information request and the request content indication information can be sent to the terminal through the same signaling.

After receiving the request content indication information, the terminal sends the corresponding SIM module information to the base station based on the module information requested by the base station.

In some embodiments, receiving the request content indication information includes: receiving a MUSIMInfoReportConfig signaling, in which the MUSIMInfoReportConfig signaling carries the request content indication information.

The base station may carry the multi-SIM information request in the UEInformationRequest signaling to request the terminal to obtain module information of multiple SIMs. The UEInformationRequest signaling may also carry the request content indication information to indicate the module information requested. The multi-SIM information request may be carried in the UEInformationRequest signaling in the form of a MUSIMInfoReq information unit, and the request content indication information may be carried in the UEInformationRequest signaling in the form of a MUSIMInfoReq information unit.

Carrying the request content indication information in the RRC signaling, or carrying the request content indication information at the same time as the multi-SIM information request, can improve the utilization efficiency of the RRC signaling, reduce the interaction complexity caused by the new added signaling and reduce the development workload.

In some embodiments, the module information of the SIM includes: identity information and/or IMEI information.

The module information may include: identity information and/or IMEI information and the like, and the base station may determine the communication network to which each SIM belongs based on the identity information and/or IMEI information and the like.

For different cellular mobile communication networks, the indication information that the terminal has the multiple SIMs can be carried in different signalings.

For example, for a fourth generation (4G) network, the indication information of the multiple SIMs may be carried in a RRCConnectionReconfigurationComplete signaling, a RRCConnectionReestablishmentComplete signaling, a RRCConnectionResumeComplete signaling, or a RRCConnectionSetupComplete signaling. The indication information of the multiple SIMs may be the MUSIMInfoAvailable information unit in the above-mentioned signalings.

Therefore, in some embodiments, step 201 may include: sending a RRCConnectionReconfigurationComplete signaling, a RRCConnectionReestablishmentComplete signaling, a RRCConnectionResumeComplete signaling, or a RRCConnectionSetupComplete signaling, that carries the indication information.

For example, using the MUSIMInfoAvailable information unit to carry the indication information may use the following code:

MUSIMInfoAvailable-r17 ENUMERATED {true} OPTIONAL

If the terminal has multiple SIMs, MUSIMInfoAvailable-r17 in the RRCConnectionReconfigurationComplete-v1700-IEs may be set to True. If the terminal does not have multiple SIMs, MUSIMInfoAvailable-r17 may be not included in the RRCConnectionReconfigurationComplete-v1700-IEs.

Carrying the request content indication information in the RRC signaling can improve the utilization efficiency of the RRC signaling, reduce the interaction complexity caused by the newly added signaling and reduce the development workload.

For example, for a fifth generation (5G) network, a RRCReconfigurationComplete signaling, a RRCReestablishmentComplete signaling, a RRC ResumeComplete, or a RRCSetupComplete signaling may carry the indication information of the multiple SIMs. Specifically, the indication information of the multiple SIMs may be the MUSIMInfoAvailable information unit in the above-mentioned signalings.

In some embodiments, step 201 may include: sending a RRCReconfigurationComplete signaling, a RRCReestablishmentComplete signaling, a RRCResumeComplete signaling, or a RRCSetupComplete signaling, that carries the indication information.

For example, using the MUSIMInfoAvailable information unit to carry the indication information may use the following code:

MUSIMInfoAvailable-r17 ENUMERATED {true} OPTIONAL

If the terminal has multiple SIMs, MUSIMInfoAvailable-r17 in the RRCConnectionReconfigurationComplete-v1700-IEs can be set to True. If the terminal does not have multiple SIMs, MUSIMInfoAvailable-r17 is not included in the RRCConnectionReconfigurationComplete-v1700-IEs.

Carrying the request content indication information in the RRC signaling can improve the utilization efficiency of the RRC signaling, reduce the interaction complexity caused by the newly added signaling and reduce the development workload.

As illustrated in FIG. 4, some embodiments provide a method for information transmission. The method for information transmission may be used in wireless communication. The method for information transmission may include the following.

In step 401, indication information is received in a process of establishing a RRC connection by a terminal, in which the indication information is sent by the terminal in response to having at least two SIMs.

In step 402, it is determined that the terminal has the at least two SIMs according to the indication information.

Herein the terminal may be a multi-SIM terminal. The behavior mode of the terminal may be dual-SIM dual-standby single-pass, dual-SIM dual-standby dual-pass or the like.

The SIM may be an SIM that exists in a separate individual form or an embedded SIM (e-SIM) that exists inside the terminal in an integrated form.

When the terminal has multiple SIMs, the terminal may send the indication information that the terminal has the multiple SIMs to the base station, to indicate the base station that it has the multiple SIMs. Herein the multiple SIMs may be two or more SIMs. The terminal may carry the indication information of the multiple SIMs in an uplink RRC signaling during establishing the RRC connection. The terminal may use any one of its own communication networks connected by the multiple SIMs to send the indication information of the multiple SIMs.

In the process of establishing the RRC connection with the base station, such as switching from the idle state to the connected state or from the inactive state to the connected state, the terminal sends the indication information that it has the multiple SIMs through the RRC signaling to the base station that establishes the RRC connection.

For example, an information unit may be set in the uplink RRC signaling during the RRC connection process for setting the indication information. For example, "1" can be used in the reserved bit of the uplink RRC signaling to indicate that the terminal has multiple SIMs and "0" can be used to indicate that the terminal has one SIM, or "0" can be used to indicate that the terminal has multiple SIMs and "1" can be used to indicate that the terminal has one SIM. Using the RRC signaling to carry request content indication information can improve the utilization efficiency of the RRC signaling, reduce the interaction complexity caused by the newly added signaling and reduce the development workload.

The indication information of the multiple SIMs may also be used to indicate the number of SIMs that the terminal has. For example, two bits can be used to indicate the number of SIMs, "00" is used to indicate that the terminal has one SIM, "01" is used to indicate that the terminal has two SIMs, "10" is used to indicate that the terminal has three SIMs and "11" is used to indicate that the terminal has four SIMs.

After receiving the indication information of the multiple SIMs, the base station can determine that the terminal has the multiple SIMs. If the base station has different configurations or different communication manners for the single-SIM terminal and the multi-SIM terminal, it can perform different configurations or adopt different communication manners based on the indication information of the multiple SIMs.

In this way, when establishing the RRC connection, the terminal can explicitly inform the base station of the event that it has the multiple SIMs, through the indication information of the multiple SIMs, which improves the transparency of states of the multiple SIMs of the terminal and increases the convenience of obtaining by the base station the multiple SIMs of the terminal. The base station can obtain the above-mentioned indication information report when establishing the RRC connection with the terminal. In this way, the base station learns whether the terminal supports the multiple SIMs earlier so as to facilitate the follow-up coordination scheduling to the multiple SIMs in the multiple SIMs of the terminal.

In some embodiments, the method for information transmission may further include: sending a multi-SIM information request in response to determining that the terminal has the at least two SIMs, in which the multi-SIM information request is configured to indicate the terminal to send module information of at least one SIM; and receiving the module information of the at least one SIM sent by the terminal in response to the multi-SIM information request.

After determining that the terminal has the multiple SIMs, the base station can request to obtain module information of one or more SIMs by sending the multi-SIM information request. Herein the module information may include: identity information of the SIM and/or operator information accessible by the SIM and the like. The module information may also include state information of the SIM, for example, the SIM is in an on or off state.

After receiving the multi-SIM information request, the terminal can send the module information of one or more SIMs to the base station.

After obtaining the module information, the base station can determine the communication network, the operator and the working state of each SIM and then can coordinate communication of each SIM. The base station can configure communication resources for each SIM through downlink commands and the like. The allocated communication resources of each SIM may not overlap. In this way, conflicts in configuration of communication resources of each SIM can be reduced.

For example, when the first SIM is paged, the communication of the second SIM may be suspended. It reduces the invalid paging for the second SIM caused by the terminal responding to the paging of the first SIM and the second SIM being disconnected from the communication network.

In some embodiments, sending the multi-SIM information request includes sending a UEInformationRequest signaling carrying the multi-SIM information request. Receiving the module information of the at least one SIM sent by the terminal in response to the multi-SIM information request includes receiving a UEInformationResponse signaling carrying the module information.

The base station may carry the multi-SIM information request in the UEInformationRequest signaling, to request the terminal to obtain module information of multiple SIMs. The multi-SIM information request may be carried in the UEInformationRequest signaling in the form of a MUSIM-InfoReq information unit.

The terminal can send the module information to the base station through the UEInformationResponse signaling. The module information can be carried in the UEInformation-Response signaling in the form of a MUSIMInfoReport information unit.

Carrying the multi-SIM information request and/or module information in the RRC signaling can improve the utilization efficiency of the RRC signaling, reduce the interaction complexity caused by the newly added signaling and reduce the development workload.

In some embodiments, the method for information transmission further includes: sending request content indication information, in which the request content indication information is configured to indicate module information of a SIM; receiving the module information of the at least one SIM sent by the terminal in response to the multi-SIM information request includes receiving module information of at least one SIM indicated by the request content indication information.

Herein module information may include: identity information of the SIM, and/or operator information accessible by the SIM, and/or state information of the SIM. The base station may receive the module information requested by the request content indication information based on communication requirements of the SIM. The request content indication information, for example, may indicate that only the identity information of the SIM is required. The multi-SIM information request and the request content indication information can be sent to the terminal through the same signaling.

After receiving the request content indication information, the terminal sends the corresponding SIM module information to the base station based on the module information requested by the base station.

In some embodiment, step 401 may include: sending a MUSIMInfoReportConfig signaling, in which the MUSIM-InfoReportConfig signaling carries the request content indication information.

The base station may carry the multi-SIM information request in the UEInformationRequest signaling to request the terminal to obtain module information of multiple SIMs. The UEInformationRequest signaling may also carry the request content indication information to indicate the module information requested. The multi-SIM information request may be carried in the UEInformationRequest signaling in the form of a MUSIMInfoReq information unit, and the request content indication information may be carried in the UEInformationRequest signaling in the form of a MUSIMInfoReq information unit.

Carrying the request content indication information in the RRC signaling, or carrying the request content indication information at the same time as the multi-SIM information request, can improve the utilization efficiency of the RRC signaling, reduce the interaction complexity caused by the new added signaling and reduce the development workload.

In some embodiments, the module information of the SIM includes: identity information and/or IMEI information.

The module information may include: identity information and/or IMEI information and the like, and the base station may determine the communication network to which each SIM belongs based on the identity information and/or IMEI information and the like.

For different cellular mobile communication networks, the indication information that the terminal has the multiple SIMs can be carried in different signalings.

For example, for a 4G network, the indication information of the multiple SIMs may be carried in a RRCConnectionReconfigurationComplete signaling, a RRCConnectionReestablishmentComplete signaling, a RRCConnectionResumeComplete signaling, or a RRCConnectionSetupComplete signaling. The indication information of the multiple SIMs may be the MUSIMInfoAvailable information unit in the above-mentioned signalings.

Therefore, in some embodiments, step 401 may include: receiving a RRCConnectionReconfigurationComplete signaling, a RRCConnectionReestablishmentComplete signaling, a RRCConnectionResumeComplete signaling, or a RRCConnectionSetupComplete signaling, that carries the indication information.

For example, using the MUSIMInfoAvailable information unit to carry the indication information may use the following code:

MUSIMInfoAvailable-r17    ENUMERATED    {true} OPTIONAL

If the terminal has multiple SIMs, MUSIMInfoAvailable-r17 in the RRCConnectionReconfigurationComplete-v1700-IEs may be set to True. If the terminal does not have multiple SIMs, MUSIMInfoAvailable-r17 may be not included in the RRCConnectionReconfigurationComplete-v1700-IEs.

Carrying the request content indication information in the RRC signaling can improve the utilization efficiency of the RRC signaling, reduce the interaction complexity caused by the newly added signaling and reduce the development workload.

For example, for a fifth generation (5G) network, a RRCReconfigurationComplete signaling, a RRCReestablishmentComplete signaling, a RRC ResumeComplete, or a RRCSetupComplete signaling may carry the indication information of the multiple SIMs. Specifically, the indication information of the multiple SIMs may be the MUSIMInfoAvailable information unit in the above-mentioned signalings.

Therefore, in some embodiments, step 401 may include: receiving a RRCReconfigurationComplete signaling, a RRCReestablishmentComplete signaling, a RRCResumeComplete signaling, or a RRCSetupComplete signaling, that carries the indication information.

For example, using the MUSIMInfoAvailable information unit to carry the indication information may use the following code:

MUSIMInfoAvailable-r17    ENUMERATED    {true} OPTIONAL

If the terminal has multiple SIMs, MUSIMInfoAvailable-r17 in the RRCConnectionReconfigurationComplete-v1700-IEs can be set to True. If the terminal does not have multiple SIMs, MUSIMInfoAvailable-r17 is not included in the RRCConnectionReconfigurationComplete-v1700-IEs.

Carrying the request content indication information in the RRC signaling can improve the utilization efficiency of the RRC signaling, reduce the interaction complexity caused by the newly added signaling and reduce the development workload.

An example is provided below in conjunction with any of the foregoing embodiments.

The disclosure proposes a method for interacting information of dual SIMs. When a multi-SIM terminal establishes an RRC connection with a base station (that is, becomes a connected state), it can notify the base station establishing the RRC connection, of the multi-SIM event through the RRC signaling. For the 4G network, it can be notified through a RRCConnectionReconfigurationComplete signaling, a RRCConnectionReestablishmentComplete signaling, a RRCConnectionResumeComplete, or a RRCConnectionSetupComplete signaling. In detail, it can be notified through the MUSIMInfoAvailable information unit in these signalings. For 5G networks, it can be notified through a RRCReconfigurationComplete signaling, a RRCReestablishmentComplete signaling, a RRCResumeComplete signaling or a RRCSetupComplete. In detail, it can be notified through the MUSIMInfoAvailable information unit in these signalings.

Taking the RRCConnectionReconfigurationComplete signaling as an example, the RRCConnectionReconfigurationComplete signaling is used to confirm the successful completion of the RRC connection reconfiguration. The content of the RRCConnectionReconfigurationComplete signaling may include:

```
Signalling radio bearer: SRB1
RLC-SAP: AM
Logical channel: DCCH
Direction: UE to E-UTRAN
RRCConnectionReconfigurationComplete message
-- ASN1START
RRCConnectionReconfigurationComplete :: =SEQUENCE {
rrc-TransactionIdentifier              RRC-TransactionIdentifier,
criticalExtensions                     CHOICE {
    rrcConnectionReconfigurationComplete-r8
                            RRCConnectionReconfigurationComplete-r8-IEs,
    criticalExtensionsFuture SEQUENCE { }
  }
}
......
RRCConnectionReconfigurationComplete-v1530-IEs :: = SEQUENCE {
  logMeasAvailableBT-r15               ENUMERATED {true}       OPTIONAL,
  logMeasAvailableWLAN-r15             ENUMERATED {true}       OPTIONAL,
  flightPathInfoAvailable-r15          ENUMERATED {true}       OPTIONAL,
  nonCriticalExtension RRCConnectionReconfigurationComplete-v1700-IEs
  OPTIONAL
```

-continued

```
}
RRCConnectionReconfigurationComplete-v1700-IEs :: = SEQUENCE {
    MUSIMInfoAvailable-r17           ENUMERATED {true}      OPTIONAL,
    nonCriticalExtension             SEQUENCE { }           OPTIONAL
}
-- ASN1STOP
```

After receiving the RRC signaling, the base station learns that the terminal has multi-SIM information. If the base station wants to obtain information about multiple SIMs of the terminal, such as identity information, it requests the terminal to obtain the multi-SIM information of the terminal through the RRC signaling. It can also specify in the signaling which information want to obtain, such as identity information, IMEI information, etc., such as, in the UEInformationRequest signaling, more specifically, through the MUSIMInfoReq information unit in the UEInformationRequest signaling to request. Optionally, it can also use the MUSIMInfoReportConfig signaling to indicate the specific information want to obtain.

Taking the UEInformationRequest signaling as an example, the UEInformationRequest signaling is a command used by the base station to retrieve information from the terminal. The content of UEInformationRequest signaling may include:

```
RLC-SAP: AM
Logical channel: DCCH
Direction: E-UTRAN to UE
UEInformationRequest message
-- ASN1START
UEInformationRequest-r9 :: =            SEQUENCE {
    rrc-TransactionIdentifier           RRC-TransactionIdentifier,
    criticalExtensions                  CHOICE {
        c1                                  CHOICE {
            ueInformationRequest-r9             UEInformationRequest-r9-IEs,
            spare3 NULL, spare2 NULL, spare 1 NULL
        },
        criticalExtensionsFuture            SEQUENCE { }
    }
}
......
UEInformationRequest-v1530-IEs :: = SEQUENCE {
    idleModeMeasurementReq-r15 ENUMERATED {true} OPTIONAL, -- Need ON
    flightPathInfoReq-r15                   FlightPathInfoReportConfig-r15 PTIONAL, --
Need ON
    nonCriticalExtension                    UEInformationRequest-v1700-IEs OPTIONAL
}
UEInformationRequest-v1700-IEs :: = SEQUENCE {
    MUSIMInfoReq-r17 MUSIMInfoReportConfig-r17    OPTIONAL, -- Need ON
    nonCriticalExtension SEQUENCE { }             OPTIONAL
}
-- ASN1STOP
```

After receiving the RRC signaling with the multi-SIM information request sent by the base station, the terminal with multi-SIM information sends its own multi-SIM information to the base station through the RRC signaling. Specifically, it can use the UEInformationResponse signaling. More specifically, it can be sent through the MUSIMInfoReport information unit in UEInformationResponse signaling.

Taking the UEInformationResponse signaling as an example, the terminal uses the UEInformationResponse signaling to transmit information requested by the base station. The content of the signaling may include:

```
RLC-SAP: AM
Logical channel: DCCH
Direction: UE to E-UTRAN
UEInformationResponse message
-- ASN1START
UEInformationResponse-r9                    ::= SEQUENCE {
    rrc-TransactionIdentifier                   RRC-TransactionIdentifier,
    criticalExtensions                      CHOICE {
        c1                                          CHOICE {
            ueInformationResponse-r9 UEInformationResponse-r9-IEs,
            spare3 NULL, spare2 NULL, spare1 NULL
```

-continued

```
    },
        criticalExtensionsFuture                    SEQUENCE { }
    }
}
......
UEInformationResponse-v1530-IEs :: = SEQUENCE {
    measResultListIdle-r15              MeasResultListIdle-r55        OPTIONAL,
    flightPathInfoReport-r15            FlightPathInfoReport-r15      OPTIONAL,
    nonCriticalExtension UEInformationResponse-v1700-IEs             OPTIONAL
}
UEInformationResponse-v1700-IEs :: = SEQUENCE {
    MUSIMInfoReport-r17             MUSIMInfoReport-r17              OPTIONAL,
    nonCriticalExtension            SEQUENCE { }                    OPTIONAL
}
MUSIMInfoReport-r17 ::= SEQUENCE {
    MUSIM-r17 SEQUENCE (SIZE (1..maxSIM-r17)) OF SIMInfo-r17        OPTIONAL,
    nonCriticalExtension            SEQUENCE { }                    OPTIONAL
}
-- ASN1STOP
```

Figure 5:
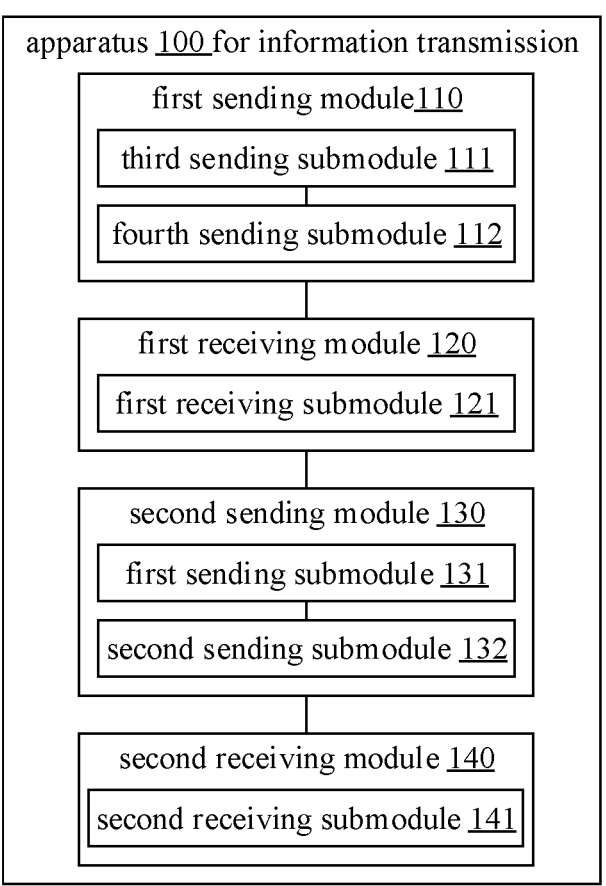
FIG. 5 is a block diagram of an apparatus for information transmission according to some embodiments.

Some embodiments of the disclosure also provide an apparatus for information transmission, which is applicable to a terminal. FIG. 5 is a block diagram of an apparatus 100 for information transmission according to some embodiments of the disclosure. As illustrated in FIG. 5, the apparatus 100 includes a first sending module 110.

The first sending module 110 is configured to send indication information that the terminal has multiple SIMs to a base station in a process of establishing a RRC connection.

In some embodiments, the apparatus 100 further includes a first receiving module 120 and a second sending module 130. The first receiving module 120 is configured to receive a multi-SIM information request sent by the base station based on the indication information. The second sending module 130 is configured to send module information of at least one of the multiple SIMs in response to the multi-SIM information request.

In some embodiment, the first receiving module 120 includes: a first receiving submodule 121 configured to receive a UEInformationRequest signaling carrying the multi-SIM information request from the base station; and the second sending module 130 includes a first sending submodule 131 configured to send a UEInformationResponse signaling carrying the module information.

In some embodiment, the apparatus 100 further includes a second receiving module 140 configured to receive request content indication information, wherein the request content indication information is configured to indicate module information of a SIM requested by the base station. The second sending module 130 includes a second sending submodule 132 configured to send module information of at least one SIM indicated by the request content indication information.

In some embodiment, the second receiving module 140 includes a second receiving submodule 141 configured to receive a MUSIMInfoReportConfig signaling, in which the MUSIMInfoReportConfig signaling carries the request content indication information.

In some embodiment, the module information of the SIM includes identity information, and/or IMEI information.

In some embodiment, the first sending module 110 includes a third sending submodule 111 configured to, in response to a connection between the terminal and the base station being a first network standard, send a RRCConnectionReconfigurationComplete signaling, a RRCConnectionReestablishmentComplete signaling, a RRCConnectionResumeComplete signaling, or RRCConnectionSetupComplete signaling, that carries the indication information.

In some embodiment, the first sending module 110 includes a fourth sending submodule 112 configured to, in response to a connection between the terminal and the base station being a second network standard, send a RRCReconfigurationComplete signaling, a RRCReestablishmentComplete signaling, a RRCResumeComplete signaling, or a RRCSetupComplete signaling, that carries the indication information.

Figure 6:
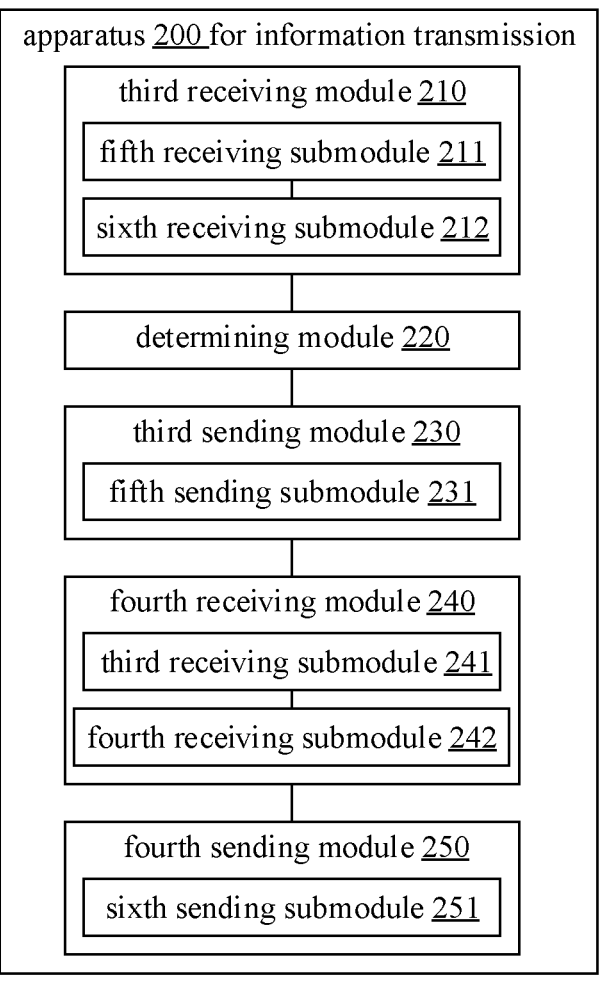
FIG. 6 is a block diagram of another apparatus for information transmission according to some embodiments.

Some embodiments of the disclosure also provide an apparatus for information transmission, which is applicable to a base station. FIG. 6 is a block diagram of an apparatus 200 for information transmission according to some embodiments of the disclosure. As illustrated in FIG. 6, the apparatus 200 includes a third receiving module 210 and a determining module 220.

The third receiving module 210 is configured to receive indication information in a process of establishing a RRC connection by a terminal, in which the indication information is sent by the terminal in response to having at least two SIMs.

The determining module 220 is configured to determine that the terminal has the at least two SIMs according to the indication information.

In some embodiment, the apparatus 200 further includes a third sending module 230 configured to send a multi-SIM information request in response to determining that the terminal has the at least two SIMs, in which the multi-SIM information request is configured to indicate the terminal to send module information of at least one SIM; and a fourth receiving module 240 configured to receive the module information of the at least one SIM sent by the terminal in response to the multi-SIM information request.

In some embodiment, the third sending module 230 includes a fifth sending submodule 231 configured to send a UEInformationRequest signaling carrying the multi-SIM information request; and the fourth receiving module 240 includes a third receiving submodule 241 configured to receive a UEInformationResponse signaling carrying the module information.

In some embodiment, the apparatus further includes a fourth sending module 250 configured to send request content indication information, in which the request content indication information is configured to indicate module information of a SIM; and the fourth receiving module 240 includes a fourth receiving submodule 242 configured to receive module information of at least one SIM indicated by the request content indication information.

In some embodiment, the fourth sending module 250 includes a sixth sending submodule 251 configured to send a MUSIMInfoReportConfig signaling, in which the MUSIMInfoReportConfig signaling carries the request content indication information.

In some embodiment, the module information of the SIM includes identity information, and/or IMEI information.

In some embodiment, the third receiving module 210 includes a fifth receiving submodule 211 configured to, in response to a connection between the terminal and the base station being a first network standard, receive a RRCConnectionReconfigurationComplete signaling, a RRCConnectionReestablishmentComplete signaling, a RRCConnectionResumeComplete signaling, or RRCConnectionSetupComplete signaling, that carries the indication information.

In some embodiment, the third receiving module 210 includes a sixth receiving submodule 232 configured to, in response to a connection between the terminal and the base station being a second network standard, receive a RRCReconfigurationComplete signaling, a RRCReestablishmentComplete signaling, a RRCResumeComplete signaling, or a RRCSetupComplete signaling, that carries the indication information.

According to the method for information transmission, communication device and the storage medium provided by embodiments of the disclosure, the terminal sends the indication information that the terminal has the multiple SIMs to the base station during the process of establishing the RRC connection. In this way, when establishing the RRC connection, the terminal can explicitly inform the base station of the event that it has the multiple SIMs, through the indication information of the multiple SIMs, which improves the transparency of states of the multiple SIMs of the terminal and increases the convenience of obtaining by the base station the multiple SIMs of the terminal. The base station can obtain the above-mentioned indication information report when establishing the RRC connection with the terminal. In this way, the base station learns whether the terminal supports the multiple SIMs earlier so as to facilitate the follow-up coordination scheduling to the multiple SIMs in the multiple SIMs of the terminal.

In some embodiments, the above modules and submodules may be implemented by one or more central processing units (CPU), a graphics processing unit (GPU), a baseband processor (BP), an application specific integrated circuit (ASIC), DSP, a programmable logic device (PLD), a complex programmable logic device (CPLD), a field programmable gate array (FPGA), a general purpose processor, a controller, a micro controller unit (MCU), a microprocessor or other electronic components in combination with one or more radio frequency (RF) antennas to perform the foregoing methods.

Figure 7:
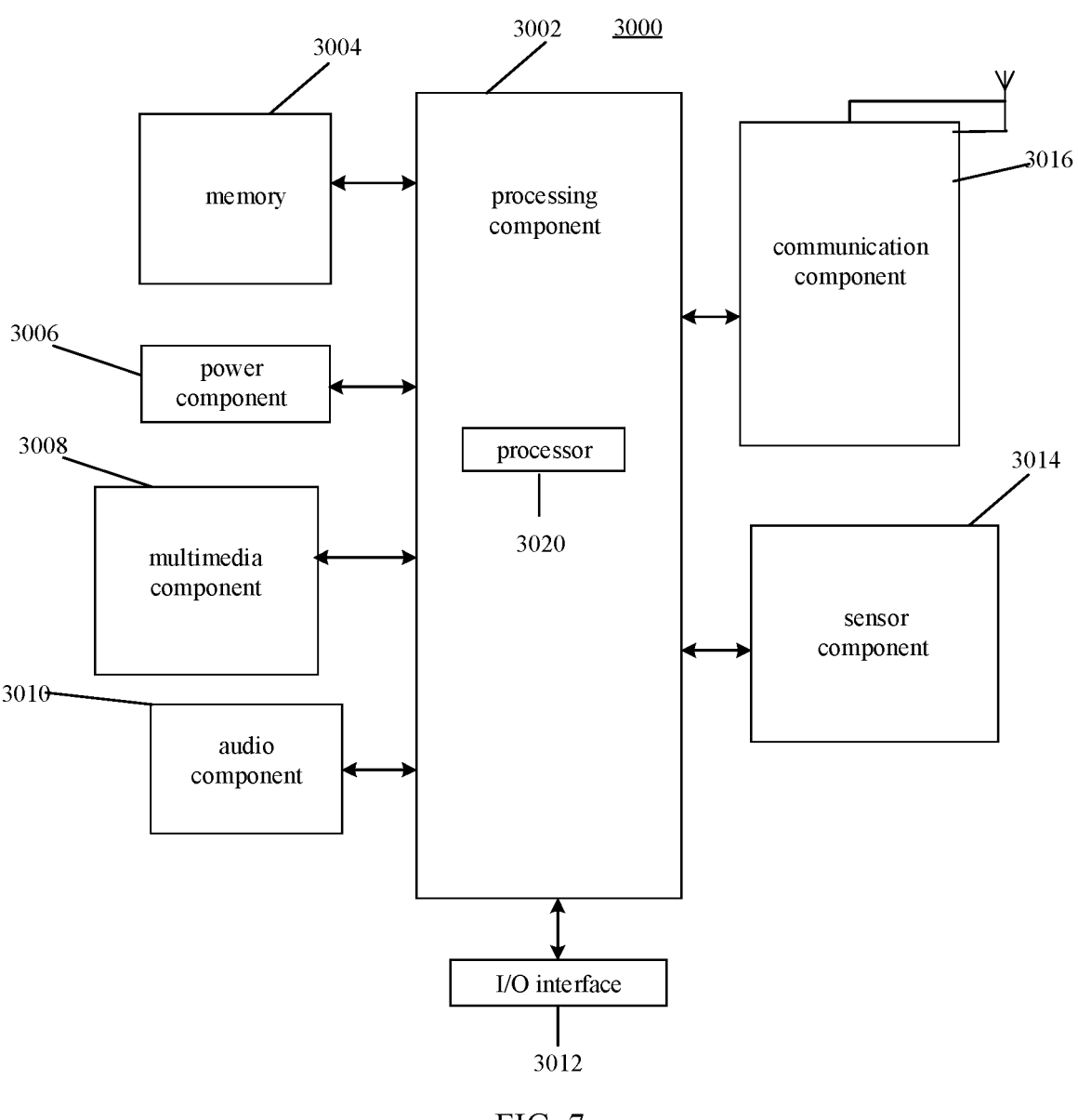
FIG. 7 is a block diagram of a device for information transmission according to some embodiments.

FIG. 7 is a block diagram of a device 3000 for information transmission according to some embodiments. For example, the device 3000 may be a mobile phone, a computer, a digital broadcast terminal, a messaging device, a gaming console, a tablet, a medical device, exercise equipment, a personal digital assistant, and the like.

Referring to FIG. 8, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to perform all or part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the device 3000. Examples of such data include instructions for any disclosures or methods operated on the device 3000, contact data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum while the device 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like.

The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a CMOS or CCD image sensor, for use in imaging disclosures. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as WiFi, 2G, or 3G, or a combination thereof. In one exemplary embodiment, the communication component 3016 receives a broadcast signal or broadcast associated information from an external broadcast management system via a broadcast channel. In one exemplary embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 3000 may be implemented with one or more disclosure specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 3004, executable by the processor 820 in the device 3000, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for information transmission in a process of establishing a radio resource control (RRC) connection between a terminal and a base station, comprising:

sending, by a terminal, an RRCReconfigurationComplete signaling, an RRCReestablishmentComplete signaling, an RRCResumeComplete signaling, or an RRCSetupComplete signaling that carries indication information that the terminal has multiple subscriber identification modules (SIMs) to a base station;

receiving, by the terminal, a multi-SIM information request sent by the base station based on the indication information; and sending, by the terminal, module information of at least one of the multiple SIMs in response to the multi-SIM information request;

wherein the module information comprises at least one of: identity information of the SIM, operator information accessible by the SIM, and state information of the SIM.

2. The method as claimed in claim 1, wherein receiving, by the terminal, the multi-SIM information request sent by the base station based on the indication information comprises:

receiving, by the terminal, a UEInformationRequest signaling carrying the multi-SIM information request from the base station;

sending, by the terminal, the module information of the at least one of the multiple SIMs comprises:

sending, by the terminal, a UEInformationResponse signaling carrying the module information.

3. The method as claimed in claim 1, further comprising:

receiving, by the terminal, request content indication information, wherein the request content indication information is configured to indicate module information of a SIM requested by the base station;

sending, by the terminal, the module information of the at least one of the multiple SIMs comprises:

sending, by the terminal, module information of at least one SIM indicated by the request content indication information.

4. The method as claimed in claim 3, wherein receiving, by the terminal, the request content indication information comprises:

receiving, by the terminal, a MUSIMInfoReportConfig signaling, wherein the MUSIMInfoReportConfig signaling carries the request content indication information.

5. The method as claimed in claim 1, wherein the module information of the SIM comprises at least one of: identity information, and international mobile equipment identity (IMEI) information.

6. A non-transitory computer-readable storage medium having stored therein an executable program that executed by a processor of a communication device, causes the communication device to perform the method as claimed in claim 1.

7. A method for information transmission in a process of establishing a radio resource control (RRC) connection between a terminal and a base station, comprising:

receiving, by a base station, an RRCReconfigurationComplete signaling, an RRCReestablishmentComplete signaling, an RRCResumeComplete signaling, or an RRCSetupComplete signaling that carries indication information, wherein the indication information is sent by the terminal in response to having at least two subscriber identification modules (SIMs); and determining, by the base station, that the terminal has the at least two SIMs according to the indication information;

sending, by the base station, a multi-SIM information request in response to determining that the terminal has the at least two SIMs, wherein the multi-SIM information request is configured to indicate the terminal to send module information of at least one SIM; and receiving, by the base station, the module information of the at least one SIM sent by the terminal in response to the multi-SIM information request;

wherein the module information comprises at least one of: identity information of the SIM, operator information accessible by the SIM, and state information of the SIM.

8. The method as claimed in claim 7, wherein sending, by the base station, the multi-SIM information request comprises:

sending, by the base station, a UEInformationRequest signaling carrying the multi-SIM information request;

receiving, by the base station, the module information of the at least one SIM sent by the terminal in response to the multi-SIM information request comprises:

receiving, by the base station, a UEInformationResponse signaling carrying the module information.

9. The method as claimed in claim 7, further comprising:

sending, by the base station, request content indication information, wherein the request content indication information is configured to indicate module information of a SIM;

receiving, by the base station, the module information of the at least one SIM sent by the terminal in response to the multi-SIM information request comprises:

receiving, by the base station, module information of at least one SIM indicated by the request content indication information.

10. The method as claimed in claim 9, wherein sending, by the base station, the request content indication information comprises:

sending, by the base station, a MUSIMInfoReportConfig signaling, wherein the MUSIMInfoReportConfig signaling carries the request content indication information.

11. The method as claimed in claim 7, wherein the module information of the SIM comprises at least one of: identity information, and international mobile equipment identity (IMEI) information.

12. A communication device, comprising a processor, a transceiver, a memory, and an executable program stored on the memory and capable of being executed by the processor, wherein the processor is configured to execute the executable program to perform the method as claimed in claim 7.

13. A non-transitory computer-readable storage medium having stored therein an executable program that executed by a processor of a communication device, causes the communication device to perform the method as claimed in claim 7.

14. A communication device, comprising a processor, a transceiver, a memory, and an executable program stored on the memory and capable of being executed by the processor, wherein the processor is configured to execute the executable program to:

send indication information from the communication device to a base station using an RRCReconfigurationComplete signaling, an RRCReestablishmentComplete signaling, an RRCResumeComplete signaling, or an RRCSetupComplete signaling during a process of establishing a radio resource control (RRC) connection between the communication device and the base station, the indication information indicating that the communication device has multiple subscriber identification modules (SIMs);

receive a multi-SIM information request sent by the base station based on the indication information; and send module information of at least one of the multiple SIMs in response to the multi-SIM information request;

wherein the module information comprises at least one of: identity information of the SIM, operator information accessible by the SIM, and state information of the SIM.

*   *   *   *   *